United States Patent [19]

Korowajczuk

[11] Patent Number: 5,765,107
[45] Date of Patent: Jun. 9, 1998

[54] DETECTION AND IDENTIFICATION OF A FRAUDULENT WIRELESS TELEPHONE USER

[75] Inventor: Leonhard Korowajczuk, 1254 Manderley Way, Herndon, Va. 22071

[73] Assignee: Leonhard Korowajczuk, Herndon, Va.

[21] Appl. No.: 619,246

[22] Filed: Mar. 21, 1996

[51] Int. Cl.⁶ .................................................. H04Q 7/00
[52] U.S. Cl. ........................ 455/410; 455/411; 380/23
[58] Field of Search .............................. 455/410, 411, 455/403, 422; 380/23; 340/825.3

[56] References Cited

U.S. PATENT DOCUMENTS

| | | | |
|---|---|---|---|
| 5,335,265 | 8/1994 | Cooper et al. | 455/410 |
| 5,440,758 | 8/1995 | Grube et al. | 455/9 |
| 5,467,382 | 11/1995 | Schorman | 455/410 |

*Primary Examiner*—Dwayne Bost
*Assistant Examiner*—Tracy M. Legree
*Attorney, Agent, or Firm*—Pollock, Vande Sande & Priddy

[57] ABSTRACT

In a cellular telephone system, a method for detecting and identifying a fraudulent user who cloned the cellular subscriber's electronic serial number and mobile identification number to gain unauthorized access to the cellular system. Cell sites transmit a paging signal on a control channel immediately after the cellular user establishes a voice communication. If an acknowledgement to the paging signal is received, then the cellular user currently engaged in the voice communication is fraudulent. A location of the fraudulent user can then be precisely identified by comparing a receiver signal strength indicator from several adjacent cell sites.

5 Claims, 2 Drawing Sheets

DETECTION AND IDENTIFICATION OF A FRAUDULENT WIRELESS TELEPHONE USER

FIELD OF THE INVENTION

This invention relates to wireless mobile telephone systems and, in particular, a method of detecting and identifying a fraudulent cellular user who illegally cloned the subscriber's telephone in an attempt to use cellular telephone service.

BACKGROUND OF THE INVENTION

Fraudulent use of wireless telephones costs the cellular industry $1.3 million a day nationwide because customers don't have to pay for fraudulent calls. It is a large percentage of loss for the industry and bound to become even larger with proliferation of cellular use. The most prevalent—and technologically advanced—type of cellular fraud is cloning.

As well known in the art, prior to establishing a voice communication, a cellular telephone must transmit its Electronic Serial Number (ESN) and Mobile Identification Number (MIN), among other things. High tech hustlers usually set up a shop at busy intersections, on overpasses or near airports, i.e., anyplace where there is likely to be heavy cellular traffic. Using a readily available scanning radio receiver, they randomly intercept the legitimate subscribers' serial numbers and mobile numbers transmitted to and from cellular towers. The serial and mobile numbers are then entered into a computer. Next, these numbers are programmed into another cellular phone. After the reprogrammed telephone has been cloned with the code of a handset that is already in use, it is ready for use in the cellular network. The user of the fraudulent telephone is then able to anonymously place local, long distance or even international telephone calls, which will later appear on the legitimate subscriber's cellular telephone bill. By the time the real subscriber notices, it is usually several thousand dollars too late.

Several methods have been suggested to overcome this fraudulent use of cellular phones. For example, many carriers have begun assigning their customers a personal identification number (PIN) which must be entered by the subscriber in order to place a call. Unfortunately, the PIN feature cannot prevent the cloning process completely. Professional "hackers" using sophisticated electronic equipment can still clone cellular phones even with the PIN feature. Furthermore, the PIN requirement complicates the use of a cellular phone: being quite burdensome, it hinders legitimate customers by forcing significant delays which may cause deleterious effects in emergency situations.

Avoiding the PIN requirement, U.S. Pat. No. 5,335,265 to Cooper et al discloses more subscriber-friendly method of detecting and preventing the subscriber number cloning. In accordance with the '265 patent, an apparatus detects temporal and spatial anomalies in the use of cellular subscriber numbers. The cloning detection apparatus makes use of call origination data to identify concurrent call originations or receptions for a single subscriber number. In addition, successive call activity is subjected to a spatial analysis to determine if two successive calls are detected for a particular subscriber in a time interval that is too short to justify the calls' geographic separation. For example, if one call is observed roaming while the next call is observed at home provided that the time interval between the two calls is very short, then one of the calls is fraudulent.

Although the '265 patent greatly contributes to the detection and prevention of cellular fraud without unduly inconveniencing the subscribers, it has some disadvantages. The '265 patent does not detect fraud if a subscriber, having the same MIN and ESN as the bogus user, does not place calls for some time. If the subscriber does not call for 24 hours, for example, the fraudulent calls cannot be identified during that period of time even though the subscriber's phone is activated, i.e., turned on.

Furthermore, the '265 patent does not immediately detect fraud within the same cell or neighboring cells. A database described in the '265 patent contains spacial distances between cell sites measured in units of time. The time difference between two successive calls is compared to the spatial distance between the cell sites in the database. If the time difference between the two successive calls is smaller than the spatial distance obtained from the database, then one of the calls is fraudulent. According to this method, when the two calls originate from two neighboring cells, then the spatial distance between the two calls is zero in accordance with the database. Thus, if a fraudulent user happens to be in a neighboring cell, the '265 patent discloses other methods for detecting cellular fraud, i.e., usage pattern and usage activity for this particular unit, etc. The same situation is encountered if both the fraudulent user and the subscriber are located in the same cell.

Furthermore, the '265 patent requires intensive computations, multiple access to a database, and extra processing power from processors.

Overcoming the above as well as other disadvantages, the present invention detects and identifies a fraudulent cellular phone without any additional equipment, databases or intensive computations.

SUMMARY OF THE INVENTION

A cellular telephone system comprises a mobile telephone switching office serving a plurality of cell sites which establish radio frequency communication with a plurality of cellular subscriber units identified by a unique subscriber information. In such system, a method is disclosed for detecting a fraudulent user who cloned the subscriber information in order to obtain illegal access to the cellular telephone system. The disclosed method comprises the steps of establishing a voice communication between a cellular user and a called party and immediately thereafter transmitting a paging signal, which comprises the user's subscriber information, to the plurality of cellular subscriber units.

Further in accordance with the present invention, the disclosed method comprises forwarding the user's subscriber information to the mobile telephone switching office if an acknowledgement to the paging signal is received from at least one cell cite and determining that the cellular user currently engaged in the voice communication is the fraudulent user.

Still in accordance with the present invention, the method further comprises receiving at least two receiver signal strength indicators (RSSI) from the cell sites and comparing the RSSI numbers to precisely identify a location of the fraudulent user.

BRIEF DESCRIPTION OF THE DRAWINGS

The above-mentioned as well as additional features of the present invention will be evident and more clearly understood when considered in conjunction with the accompanying drawings, in which.

In all Figures, like reference numerals represent same or identical components of the present invention.

DESCRIPTION OF THE PREFERRED EMBODIMENTS

Figure 1:
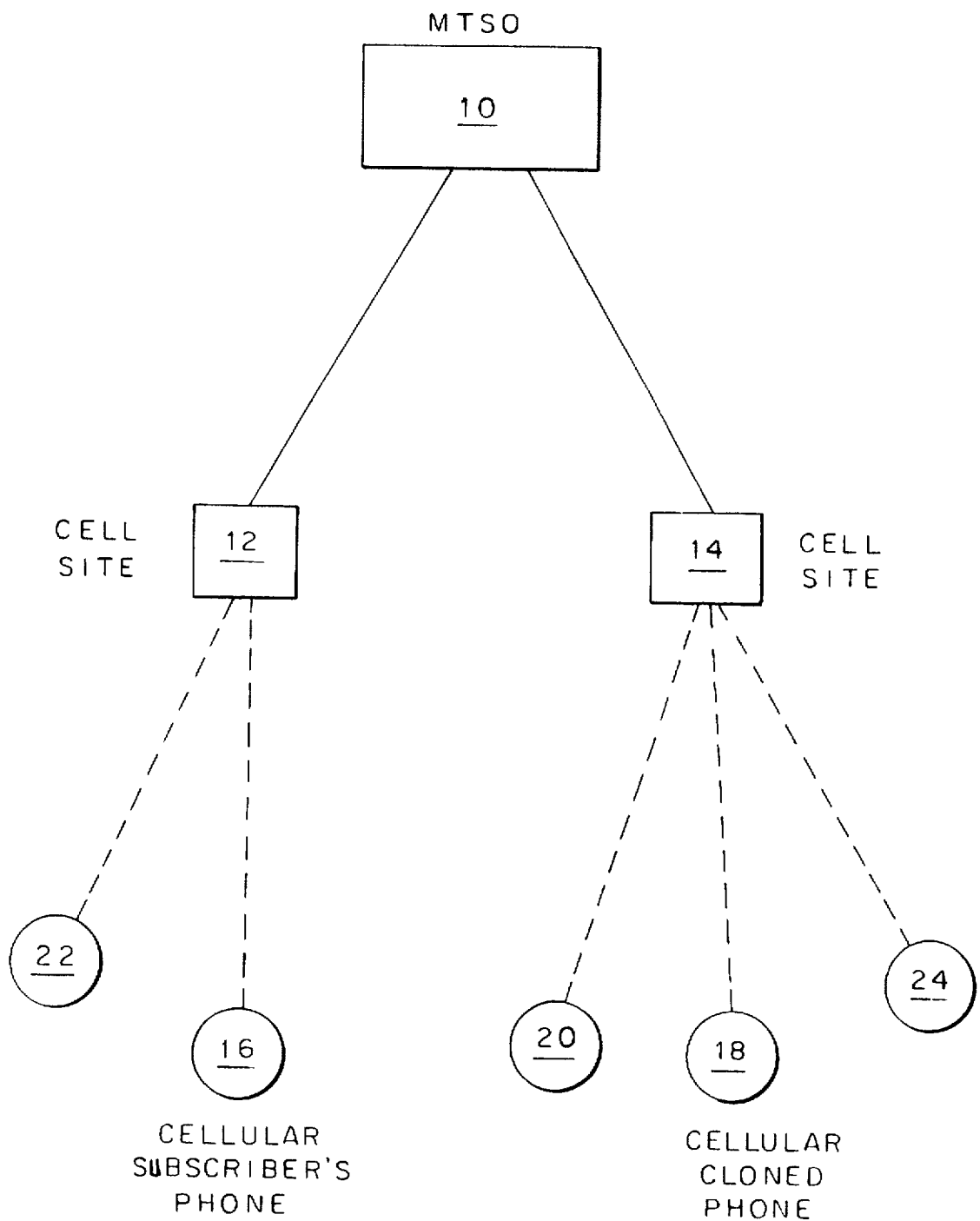
FIG. 1 shows a block diagram of a cellular mobile telephone system.

FIG. 1 shows a block diagram of a cellular mobile telephone system operating in 800–900 MHz frequency range. It essentially consists of a Mobile Telephone Switching Office (MTSO) 10, a plurality of cell sites 12, 14, also known as base stations or cellular towers, situated throughout a geographical region, and a plurality of cellular telephones or units 16, 20, 22, 24 hereinafter referred to as subscribers. A cellular unit 18, referred to as a fraudulent user, is a cellular telephone which has the same ESN and MIN as the subscriber 16 and utilizes the cellular mobile telephone system illegally.

The MTSO 10 is a fast-processing computer that controls an entire operation of the cellular system. It switches calls between two cellular units, as well as cellular and land-line users, monitors cellular calls, keeps track of cellular subscribers' locations, arranges handoffs, provides billing information, etc.

Cell sites 12, 14 are linked to the MTSO 10 for traffic coordination. Each cell site 12, 14 includes a high power antenna system coupled to a transmitter and a receiver configuration, i.e., transceiver, and may cover a few city blocks or a larger area. The coverage area of one cell site overlaps with another and is limited by topography, buildings and other objects which affect radio frequency (RF) transmission. Utilizing radio frequency transmission channels, the transceiver communicates with cellular subscribers over wireless medium.

When a subscriber initiates a call from a cellular unit, a call initiation request is placed on a control channel as a part of signaling information. The cellular unit transmits its Mobile Identification Number (MIN), Electronic Serial Number (ESN), along with the destination telephone number. If a cell cite successfully receives this information, it is forwarded to the MTSO which acts as a central coordinating site for the entire cellular network. The MTSO may check whether the subscriber is registered and if so, assign the call to an available voice channel for subsequent conversation.

When a subscriber receives a call, the operation is as follows. The incoming call is received by the MTSO which directs each cell site to transmit a paging message on its control channel. The paging message comprises the subscriber's mobile identification number. Each cellular unit constantly monitors the control channel, and when its MIN is successfully detected, the cellular unit transmits an acknowledgement signal on the control channel. When a particular cell site receives the acknowledgement signal, a notification is sent to the MTSO which then directs that site to issue a voice channel. In this manner, the conversation is carried out on a dedicated channel separate from the control channels.

As the cellular unit travels throughout the service area during a typical conversation, the MTSO coordinates and issues numerous handoffs. The handoffs automatically switch subscribers to different voice channels at different cell sites throughout a service area. Handoff decisions are made by the MTSO when the signal strength on the current voice channel falls below a predetermined threshold level of a receiver signal strength indicator (RSSI).

In accordance with the present invention, detection of a fraudulent user is accomplished as follows. Using the unauthorized telephone, the fraudulent user 18 dials a telephone number in order to place a cellular call to either a cellular or landline user. To set up the call, the MIN, ESN, and the destination telephone number are transmitted to the cell site 14 via RF control channel, as explained above.

The transceiver at the cell site 14 receives the transmitted information which is immediately transferred to the MTSO 10. If the destination number belongs to another cellular subscriber, the MTSO 10 instructs each cell site to transmit a paging message on the control channel. Once an acknowledgement signal is received, the MTSO 10 directs that site to issue a voice channel, as also described above. If the destination number belongs to a landline user, the MTSO 10 switches the call via the public switched telephone network, as well known in the art.

After the fraudulent user 18 is connected to the called party, the voice communication is established between the two. As stated earlier, the cellular phone of the subscriber 16 has the same MIN and ESN as the telephone unit of the fraudulent user 18. While the fraudulent user 18 talks on the phone, it is assumed that the subscriber 16 is not engaged in a conversation, but has his cellular unit activated, i.e., turned on.

As soon as the voice communication is established between the fraudulent user 18 and the called party, the MTSO 10 directs each cell site to broadcast a paging signal comprising the ESN and MIN of the fraudulent user 18. This paging signal is transmitted on a control channel, similar to the paging signal sent during the incoming call as described above. Since the fraudulent user 18 is engaged in a voice conversation, only the subscriber's cellular unit 16 can answer the paging signal by transmitting an acknowledgement signal on the control channel.

When a particular cell site receives the acknowledgement signal, it is forwarded to the MTSO 10 in accordance with the established procedure. Keeping track of all cellular users, the MTSO 10 identifies the user who is currently engaged in a conversation as fraudulent, while the user answering the paging signal is a legitimate subscriber.

If the cell sites 12, 14 do not receive an acknowledgement signal to their paging signals, then the user currently engaged in conversation cannot be identified as a fraudulent user.

After establishing voice communication, the fraudulent user 18 may travel to an area best handled by another cell site. The handoff may then occur between cell sites as determined by the MTSO 10 based on a threshold level of the RSSI for a transceiver.

Figure 2:
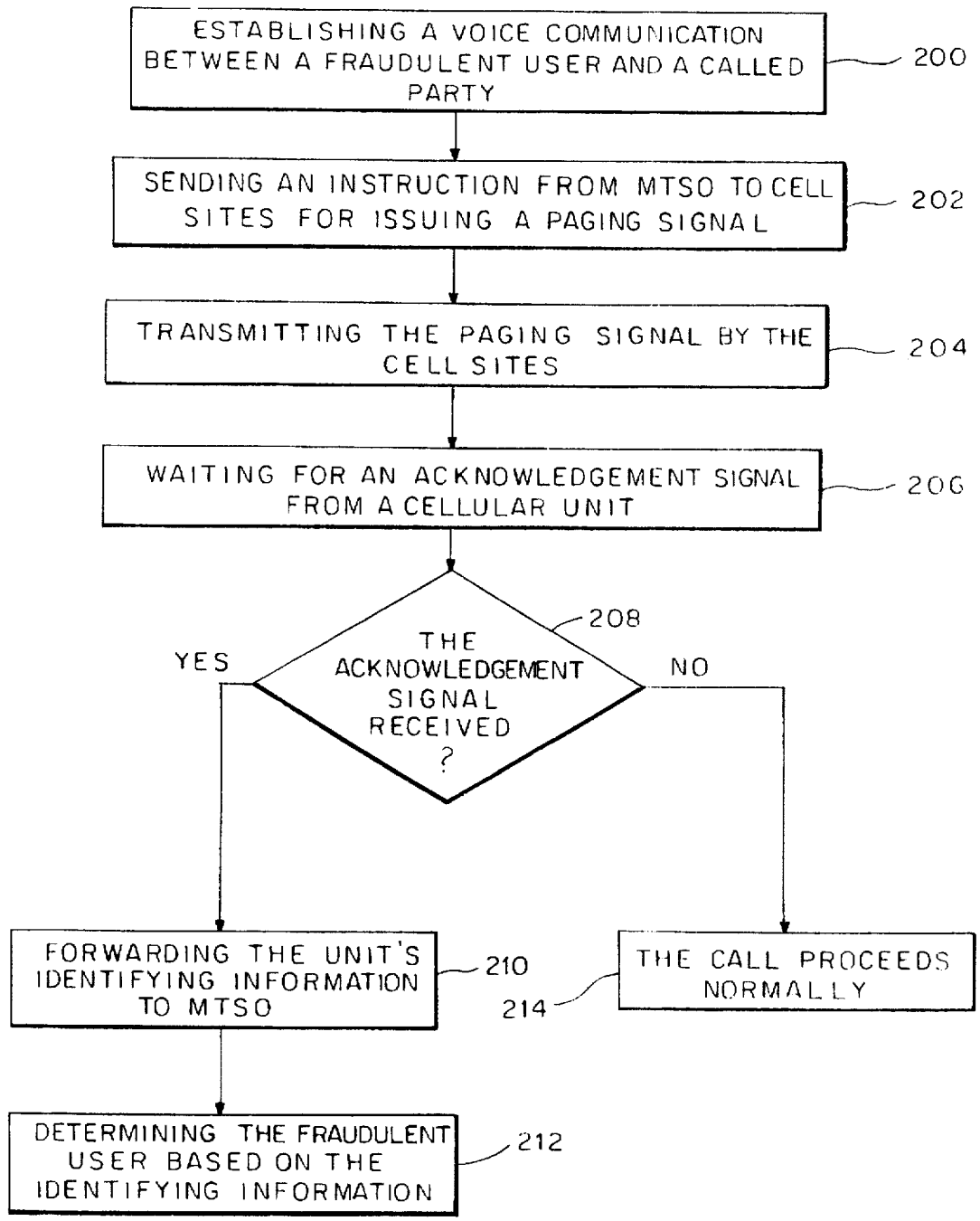
FIG. 2 shows steps for detecting a fraudulent cellular user in accordance with the present invention.

FIG. 2 shows steps involved in the detection of a fraudulent cellular user in accordance with the present invention. In step 200, voice communication between the fraudulent user 18 and the called party is established. In step 202, the MTSO 10 sends an instruction to the cell sites 12, 14 to issue a paging signal comprising the ESN and MIN of a user engaged in a voice conversation. Step 204 shows the cell sites 12, 14 responding to the MTSO's 10 instruction by transmitting a paging signal. In step 206, each of the cell sites 12, 14 waits for an acknowledgement signal from a cellular unit. If the acknowledgement signal is received from a cellular unit, as shown in step 208, that unit's identifying information, such as the ESN and MIN, is forwarded to the MTSO 10 in step 210. Based on this, in step 212 the MTSO 10 determines that the cellular unit currently engaged in the voice conversation is fraudulent. If no acknowledgement signal is received by the cell sites 12, 14 in response to the paging signal, the call proceeds normally at this time, as illustrated in step 214.

More often than not, the unit that answers the page is the subscriber's unit, because fraudulent users usually turn their units off when not engaged in a conversation to avoid being traced. Therefore, it can be safely assumed that the fraudulent user does not receive any calls, and the unit that answers the paging signal belongs to a subscriber.

Further in accordance with the present invention, once the fraudulent user 18 is detected, the fraudulent user's 18 location is identified as follows. As stated earlier, the MTSO 10 receives the RSSI numbers from cell sites to effect the handoff when a cellular unit is moving outside the serving area of a particular cell site. A computer under the operation of a computer program, currently used by the MTSO 10 and available from several suppliers, calculates and analyzes the signal strength received by the transceivers. Thus, after the fraudulent user 18 is detected in accordance with the present invention, the RSSI numbers from neighboring cell sites are examined by the computer at the MTSO 10. Since the cell sites overlap their areas of cellular telephone coverage, RSSI numbers will contain different signal reception pertaining to the fraudulent user 18. Based on these numbers processed by the computer program executed by the computer, the fraudulent user's 18 location can be determined with the accuracy of several blocks using a triangulation method or otherwise. It is understood, of course, that the granularity and precision for identifying the fraudulent user's 18 location is based on the coverage area of each cell site as maintained by a wireless service provider.

Although the above description refers to a single cellular telephone system, it is understood that the present invention also applies to a network or networks comprising multiple cellular telephone systems interconnected via IS-41 or other protocols.

Since those skilled in the art can modify the disclosed specific embodiment without departing from the spirit of the invention, it is, therefore, intended that the claims be interpreted to cover such modifications and equivalents.

What is claimed is:

1. In a cellular telephone system comprising at least one mobile telephone switching office serving a plurality of cell sites which establish radio frequency communication with a plurality of cellular subscriber units identified by a unique subscriber information, a method of detecting a fraudulent user who cloned said subscriber information in order to obtain illegal access to said cellular telephone system, said method comprising the steps of:

establishing a voice communication between a cellular user and a called party;

following said establishment of voice communication, transmitting a paging signal comprising said cellular user's subscriber information to said plurality of cellular subscriber units;

if in response to said paging signal an acknowledgement signal is received from at least one cell cite of said plurality of cell sites, forwarding said cellular user's subscriber information to said mobile telephone switching office; and determining that said cellular user engaged in said voice communication is said fraudulent user.

2. The method according to claim 1, further comprising receiving at least two receiver signal strength indicators from said plurality of cell sites and comparing said receiver signal strength indicators with each other to precisely identify a location of said fraudulent user.

3. The method according to claim 1, wherein said step of transmitting said paging signal comprises transmitting an electronic serial number and a mobile identification number.

4. The method according to claim 1, wherein said paging signal is transmitted on a control channel of said cellular telephone system.

5. The method according to claim 1, wherein said steps are performed in one cellular telephone system connected with at least another cellular telephone system in a cellular telephone network.

* * * * *